(12) United States Patent
Freeman (10) Patent No.: US 6,655,788 B1
(45) Date of Patent: Dec. 2, 2003

(54) COMPOSITE STRUCTURE FOR ENHANCED FLEXIBILITY OF ELECTRO-OPTIC DISPLAYS WITH SLIDING LAYERS

(75) Inventor: Gary A. Freeman, Newton, MA (US)

(73) Assignee: Viztec Inc., Tampa, FL (US)

( * ) Notice: Subject to any disclaimer, the term of this patent is extended or adjusted under 35 U.S.C. 154(b) by 0 days.

(21) Appl. No.: 10/147,628

(22) Filed: May 17, 2002

(51) Int. Cl.$^7$ .............................................. G02F 1/1333
(52) U.S. Cl. ........................................................ 347/58
(58) Field of Search ...................... 349/58, 60; 235/488, 235/380; 361/681, 682

(56) References Cited

U.S. PATENT DOCUMENTS

| | | | |
|---|---|---|---|
| 4,685,771 A | 8/1987 | West et al. ............. 350/347 V |
| 4,688,900 A | 8/1987 | Doane et al. ........... 350/347 V |
| 4,876,441 A | * 10/1989 | Hara et al. .................. 235/488 |
| 4,948,232 A | 8/1990 | Lange ......................... 350/334 |
| 5,321,533 A | 6/1994 | Kumar ......................... 359/51 |
| 5,333,074 A | 7/1994 | Hikmet ........................ 359/51 |
| 5,473,450 A | 12/1995 | Yamada et al. ............... 359/51 |
| 5,530,566 A | 6/1996 | Kumar ......................... 359/51 |
| 5,679,414 A | 10/1997 | Akashi et al. ................. 428/1 |
| 5,751,388 A | 5/1998 | Larson ......................... 349/96 |
| 5,949,508 A | 9/1999 | Kumar et al. ............... 349/122 |
| 5,978,063 A | 11/1999 | Crawford et al. ........... 349/155 |
| 5,999,239 A | 12/1999 | Larson ......................... 349/96 |
| 6,019,284 A | 2/2000 | Freeman et al. ............. 235/380 |
| 6,051,639 A | 4/2000 | Mehl et al. .................. 524/205 |
| 6,128,056 A | 10/2000 | Kubota et al. ................. 349/86 |
| 6,141,071 A | 10/2000 | Sharp .......................... 349/121 |
| 6,195,196 B1 | 2/2001 | Kimura et al. .............. 359/295 |
| 6,211,994 B1 | 4/2001 | Byker .......................... 359/272 |
| 6,284,418 B1 | 9/2001 | Trantolo ...................... 430/20 |
| 6,293,470 B1 | 9/2001 | Asplund ..................... 235/487 |
| 6,310,612 B1 | 10/2001 | Kotsubo et al. ............. 345/173 |
| 6,310,671 B1 | 10/2001 | Larson ......................... 349/96 |
| 6,311,076 B1 | 10/2001 | Peuhu et al. ................. 455/566 |
| 6,312,304 B1 | 11/2001 | Duthaler et al. .............. 445/24 |
| 6,316,278 B1 | 11/2001 | Jacobsen et al. ............. 438/22 |
| 6,330,208 B1 | 12/2001 | Chen et al. ................... 368/84 |
| 6,335,818 B1 | 1/2002 | Torres ......................... 359/296 |
| 6,356,376 B1 | 3/2002 | Tonar et al. ................. 359/267 |
| 6,362,915 B1 | 3/2002 | Sheridon et al. ............ 359/296 |
| 2001/0002858 A1 | 6/2001 | Kageyama et al. ......... 349/158 |
| 2002/0019296 A1 | 2/2002 | Freeman et al. .............. 482/4 |
| 2002/0180344 A1 | * 12/2002 | Lichtfuss .................... 313/498 |
| 2002/0180709 A1 | * 12/2002 | Lichtfuss .................... 345/173 |

* cited by examiner

Primary Examiner—Robert H. Kim
Assistant Examiner—Timothy L Rude
(74) Attorney, Agent, or Firm—Jones Day (57) ABSTRACT

The invention provides a thin, lightweight, durable electro-optic display assembly that is significantly mote flexible than known plastic electro-optic displays. The enhanced flexibility of the plastic display assemblies according to the invention is achieved by employing laminate display structures in which there is little, if any, bonding between adjacent layers of the laminate assembly.

41 Claims, 10 Drawing Sheets

COMPOSITE STRUCTURE FOR ENHANCED FLEXIBILITY OF ELECTRO-OPTIC DISPLAYS WITH SLIDING LAYERS

BACKGROUND OF THE INVENTION

Commercially, it is highly desirable for an electronic display to be as thin and light as possible while still maintaining a high degree of ruggedness and imperviousness to forces that are a consequence of shock and drop. In the area of mobile electronics, such as cellular telephones, personal digital assistants (PDAs), and the like, size and weight are critical factors to the commercial success of a product. However, breakage of the electro-optic displays within these devices remains the primary cause of repairs and product returns.

In general, electro-optic displays contain an electro-optic material having an optical state that changes as a function of an applied electric or magnetic field. The electro-optic material can be contained on a single substrate or can form an electro-optic layer between two substrates that are bonded together. Traditionally, electro-optic displays have been manufactured using glass substrates, making the product heavy, rigid and prone to breakage. Lighter, thinner displays employing rigid plastic substrates also require structural support and shock absorption properties to prevent or reduce breakage. Therefore, attention in the industry has turned to the need for electro-optic displays that are thin and lightweight and can also be bent or flexed while maintaining desirable durability.

There are many useful applications for such flexible products. For example, so-called 'electronic paper' in which fiber paper is replaced with a display would be much more compelling as a product if the electro-optic display could be rolled up or folded like traditional paper. Wearable electronics, such as pagers, computers or multifunction watches, and the like, would be more comfortable to the wearer if the display conformed to the user's body. Integrated circuit chip cards or smart cards, which have strict flexure life-test performance standards, would be able to incorporate flexible electro-optic displays and still conform to those standards.

In addition to the electro-optic layer and substrate(s), electro-optic displays such as liquid crystal displays (LCDs) require additional layers such as polarizers, analyzers, reflectors, and the like, to achieve the desired electro-optic effect. In applications requiring input by a user, an electro-optic display of any type can also include a touchscreen incorporated into the overall display assembly. Often, electro-optic display assemblies can include a protective barrier layer, an anti-scratch layer, and the like.

Conventionally, all of the layers of the electro-optic display assembly are bonded together by optically-clear adhesives, or other similar means. This results in a laminate having an increased rigidity, in much the same way that bonding multiple thin layers of wood together results in a plywood sheet having significantly enhanced rigidity and strength. Even when the individual layers of the laminate stack are very thin, the overall flexibility of the bonded laminate is still significantly less than the flexibility of a single sheet of plastic having an equivalent thickness. The relatively inflexible mechanical properties of these plastic displays are therefore considered detrimental for performance in applications in which very flexible plastic displays are desirable.

There is a need, therefore, for multiple layer flexible electro-optic displays that have enhanced flexibility.

SUMMARY OF THE INVENTION

The invention provides a thin, lightweight, durable electro-optic display assembly that is significantly more flexible than known plastic electro-optic displays, while eliminating the need for additional structural support and shock absorption that glass displays and even rigid plastic displays require. The enhanced flexibility of the electro-optic display assemblies according to the invention is achieved by employing laminate display structures in which there is little, if any, bonding between adjacent layers of the laminate assembly. If any bonding is used, it is localized to areas where stress induced by flexing of the laminate assembly is minimized. As a result, the flexible electro-optic display assemblies according to the invention retain all the advantages of known plastic electro-optic displays, while providing desirably enhanced flexibility.

In one embodiment, the invention provides a flexible electro-optic display assembly that comprises an electro-optic display element that comprises a material having an optical state that changes as a function of an applied electric or magnetic field, at least one laminar layer in sliding apposition to the display element, and optionally one or more additional slidingly apposed laminar layers, wherein the electro-optic display element, the at least one laminar layer and the optional one or more additional laminar layers comprise individual layers of a laminate assembly; and a structure element for fastening together the individual layers of the laminate assembly, wherein the structure element engages a portion of the laminate assembly so as to maintain the individual layers of the laminate assembly in the sliding apposition, wherein upon flexing of the laminate assembly, the individual layers slide relative to each other.

The structure element can comprise a flexible frame structure having an inner periphery defining a viewing area for a liquid crystal display, the flexible frame structure engaging peripheral portions of the laminate assembly so as to maintain the individual layers of the laminate assembly in the sliding apposition, wherein upon flexing of the display assembly, the individual layers slide relative to each other. The resulting flexible electro-optic display assembly can be mounted into any desired device, such as a cellular telephone, computer, watch band, PDA, pager, clock, integrated circuit chip card, or the like. Alternatively, the device itself can provide the flexible frame structure for the laminate assembly, such as by molding a portion of the device over the laminate assembly.

In another embodiment, the invention provides a flexible electro-optic display assembly such as that described in the embodiment above, wherein the structure element, such as a flexible frame structure, has a top surface portion comprising an area for viewing a liquid crystal display, and a body portion, wherein the top portion and the body portion comprise a housing for the laminate assembly so as to maintain the individual layers of the laminate assembly in the sliding apposition, wherein upon flexing of the housing, the individual layers of the laminate assembly slide relative to each other. An exemplary use for this embodiment is an integrated circuit chip card.

In yet another embodiment of the flexible electro-optic display assembly of the invention, the electro-optic display element, the at least one laminar layer and the optional one or more additional laminar layers comprise individual layers of a laminate assembly having a deflection axis. A fastener is provided for fastening together the individual layers of the laminate assembly. The fastener maintains the individual layers of the laminate assembly in a first position relative to one another at the fastener, and wherein upon flexing of the display assembly, the individual layers slide relative to each other in regions outside the fastener.

The flexible plastic electro-optic display assemblies according to embodiments of the invention are especially suitable for, but not limited to, applications such as "electronic paper" and the like, wearable electronics, such as computers, multifunction watches, and the like, and other electronic and/or mobile communication device applications, such as cellular telephones, PDAs, pagers, calculators, clocks, integrated circuit chip cards, computers, television sets, combinations of the foregoing, and the like.

DETAILED DESCRIPTION OF THE INVENTION

The enhanced flexibility of the electro-optic display assemblies according to the invention is achieved by employing laminate display structures in which there is little, if any, bonding between adjacent layers of the laminate assembly. If any bonding is used, it is localized to areas where stress induced by flexing of the laminate assembly is minimized. Therefore, the invention provides an electro-optic display assembly having laminate layers with enhanced flexibility over known display assemblies. The invention can be applied to any electro-optic display having two or more layers including, but not limited to, displays employing electro-optic materials such as liquid crystals, polymer dispersed liquid crystals, electrophoretic microparticles, rotating bichromal microbeads, thin film electroluminescent material, thin film photoluminescent material, organic light emitting diodes and other electrochomic materials, and the like.

An electro-optic display element can be defined as an element that comprises a material having an optical state that changes as a function of an applied electric or magnetic field, including photoelectric-induced luminescence. That is, the material is "switchable" from one optical state to another. Generally, the switchable material is associated with one or more substrates on which electrodes may be located to change the optical state of the material in accordance with a desired pattern.

There are a variety of different types of electro-optic displays employing the switchable electro-optic material disposed between two substrates that are bonded together to form a so-called microencapsulated display. For example, electrophoretic displays achieve images by electrophoresis, the rapid migration of microparticles in colloidal suspensions. In this type of display, light scattering particles are moved within a dyed colloidal suspension by electrostatic forces. The particles either move toward the viewer, in which case the typically white particles are observed, or to the surface away from the viewer, in which case the white particles are hidden by the dark dye.

Cholesteric displays employ a cholesteric liquid crystal material that, when sandwiched between conducting electrodes, can be switched between two stable states—the so-called focal conic and planar states—in which the helical structures of the liquid crystal have different orientations. In the focal conic state, the helical structures are unaligned and the liquid crystal is transparent. In the planar state, the axes of the helical structures are all perpendicular to the display's surface resulting in essentially monochromatic transmission by the display.

Another type of microencapsulated display employs microscopic beads, randomly dispersed and held in place between two plastic substrates by a flexible elastomeric matrix of oil-filled cavities. The balls have strongly contrasting hemispheres, black on one side and white on the other. The white side is highly reflective, while the black side absorbs light. Each hemisphere has a unique intrinsic charge, resulting in a force on the ball when an electric field is applied and the axis of the ball is not aligned with the field. The side of the ball presented for display depends on the polarity of the voltage applied to the electrode.

Liquid crystal displays (LCDs) are attractive because of the low drive voltages required to switch them, their relatively fast response times, the wide availability of drive electronics, and the significant intellectual and manufacturing investment in the technology. Attempts have been made to develop LCDs that intermix the liquid crystal within a polymer matrix in order to make them compatible with plastic substrates, one example being polymer dispersed displays (PDLCDs). PDLCDs are fabricated by intermixing the liquid crystal and a pre-polymer into a solution prior to assembling the display. After assembling the display, the polymer is cured, typically by ultraviolet light. During the polymerization the LC separates out from the polymer into microscopic droplets. Since the droplets of LC are not in contact with any alignment layer, the orientation of the molecules is random and light is scattered by the droplets. Applying a voltage to the electrodes of the PDLCD causes the LC molecules to become aligned, resulting in the display becoming transparent.

All of the foregoing electro-optic displays can employ layers on an outer surface of one or more of the substrates such as, but not limited to, polarizers, analyzers, reflectors, or other optical compensation elements, anti-scratch layers and other protective barrier layers, and the like, and combinations of any of the foregoing.

There are also a variety of electro-optic displays employing an electro-optic (or photo-optic) material disposed on one substrate. For example, thin film electroluminescent (TFEL) displays employ a glass sheet as a substrate that is coated with an electrode (e.g., indium tin oxide) and a light-emitting phosphor film (e.g., ZnS:Mn). A thin film black layer is then deposited to provide optical contrast, followed by application of a rear electrode (e.g., aluminum). The display is then "encapsulated" with a solid gel and a glass cover plate to keep out moisture. These displays also can employ additional layers on an outer surface of the electro-optic layer and/or the substrate layer, such as but not limited to, absorption and interference filters, reflective layers, protective layers, and the like.

Organic light emitting diodes (OLEDs) form another type of electro-optic display based on light emission by phosphorescent phosphors upon electrical stimulation. The OLED can employ a glass substrate as a substrate that is coated with an electrode and a light-emitting small molecule based on, e.g., aluminum quinolate (Alq3). These displays also can employ additional layers on an outer surface of the electro-optic layer and/or the substrate layer, such as but not limited to, polarizer layers, reflective layers, protective layers, and the like.

Each of the foregoing embodiments of electro-optic displays can additionally include a touchscreen element incorporated into the overall display assembly, for applications requiring input by a user.

In one embodiment, the invention provides a flexible electro-optic display assembly comprising an electro-optic display element that comprises a material having an optical state that changes as a function of an applied electric or magnetic field, at least one laminar layer in sliding apposition to the display element, and optionally one or more additional slidingly apposed laminar layers, wherein the electro-optic display element, the at least one laminar layer and the optional one or more additional laminar layers comprise individual layers of a laminate assembly; and a structure element for fastening together the individual layers of the laminate assembly, wherein the structure element engages a portion of the laminate assembly so as to maintain the individual layers of the laminate assembly in the sliding apposition, wherein upon flexing of the laminate assembly, the individual layers slide relative to each other.

Figure 1A:
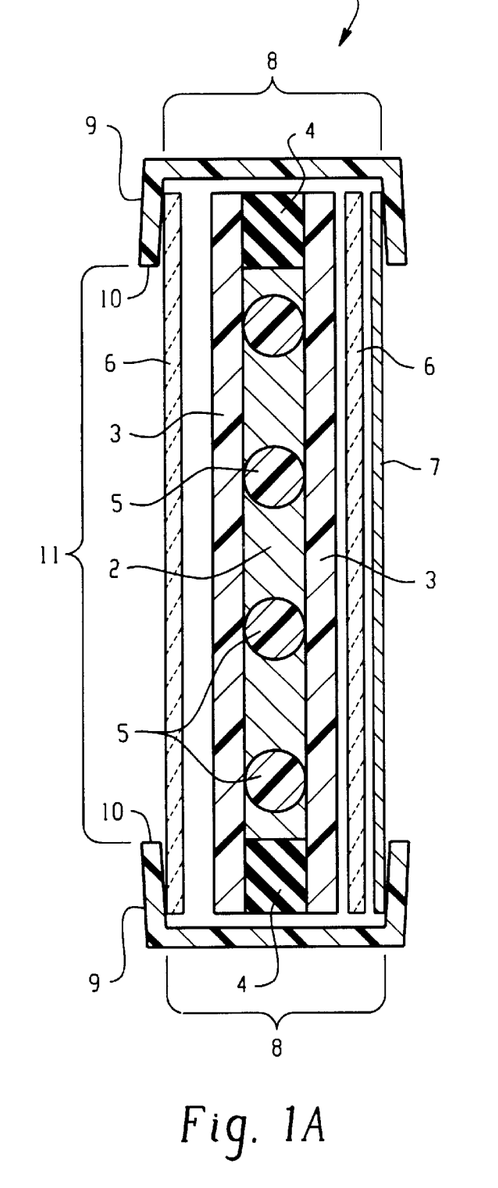
FIG. 1A is a cross-sectional view of a flexible electro-optic display assembly according to the invention, comprising a liquid crystal display element and laminar layers in sliding apposition, held together by a structure element such as a flexible frame structure.
Figure 1B:
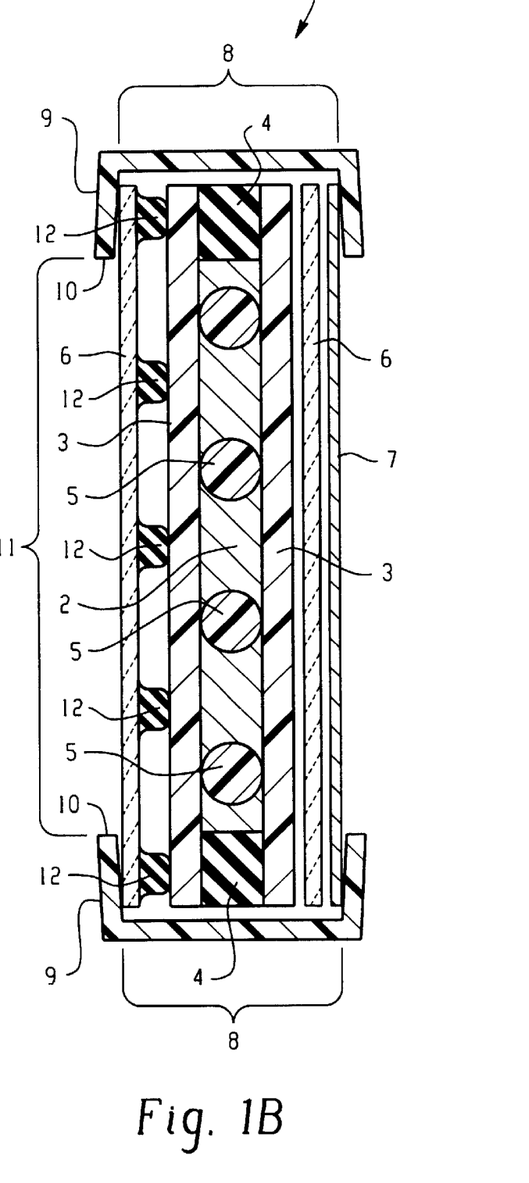
FIG. 1B is a view similar to FIG. 1A, illustrating spacing elements that can be used to prevent optical interference patterns resulting when the inner surfaces come in contact.

In embodiments illustrated in FIGS. 1A and 1B, a flexible electro-optic display assembly 1 according to the invention includes an electro-optic display element that contains an electro-optic material 2, disposed between two substrates 3 that are bonded together, such as by a gasket 4. Bonding between two or more substrates can be achieved by an adhesive, by ultrasonic welding, by laser cutting, or the like. The adhesive can be an ultraviolet cured adhesive, if desired. The type of bonding of the substrates is not critical to the invention. Although two substrates are illustrated, an electro-optic display element having one substrate is not excluded. Further, the display element is not limited to any one type of element design. The type of electro-optic material employed and the configuration of the material with or without other compounds or electrode materials within the element are not critical to the invention. In the embodiment illustrated in FIG. 1, spacers 5 are shown as an example of other non-limited materials that can be included in the electro-optic display element.

The substrate(s) 3 can be made of commonly used optically clear materials such as, but not limited to, cast allyldiglycol carbonate, or the like, which is a relatively rigid material. Flexible clear plastic materials including, but not limited to, polycarbonate, polyethersulfone, polyethylene naphthalate, and the like, that are well known to those skilled in the art, can also be employed as the substrate(s). Alternatively, the substrate(s) may be made of clear glass, preferably a very thin flexible glass. For example, a suitable flexible glass substrate is about 0.030 mm thick and available from Schott Glass Technologies, Inc., Duryea, Pa. If desired, the substrate can comprise a composite of a polymer and a ceramic or a composite of a polymer and an inorganic material, which are well known materials. Moreover, if two or more substrates are employed, they can be individually made from different materials. An advantage of the display assembly according to the invention is that commonly obtained plastic, glass or composite substrate materials can be employed that are optimized for such desirable features as hardness, scratch-resistance, puncture resistance, and the like, but can have very little elasticity or be very flexible.

The display assembly 1 also includes one or more layers adjacent to an outer surface of the electro-optic material and/or to at least one of the substrates 3, to achieve the desired electro-optic effect. These layers can include, but are not limited to, polarizers 6, a reflector 7, and the like, but can include other or alternative desirable layers, such as an analyzer, an optical compensation element, or other layers known to those of ordinary skill in the art of electro-optic displays. Commonly used polarizers, analyzers and reflectors can be employed without limitation. In addition to enhancing the electro-optic effect, these layers can add desired features, such as hardness and scratch resistance or anti-reflection layers to the display assembly. Other layers can include an anti-scratch layer or any type of protective barrier layer. Additionally, the layers may include a flexible touchscreen input subassembly, currently manufactured and incorporated into rigid products such as Palm Pilots or other PDAs. The layers, together with the electro-optic display element are all slidingly apposed and comprise individual layers of a laminate assembly 8.

Figure 2:
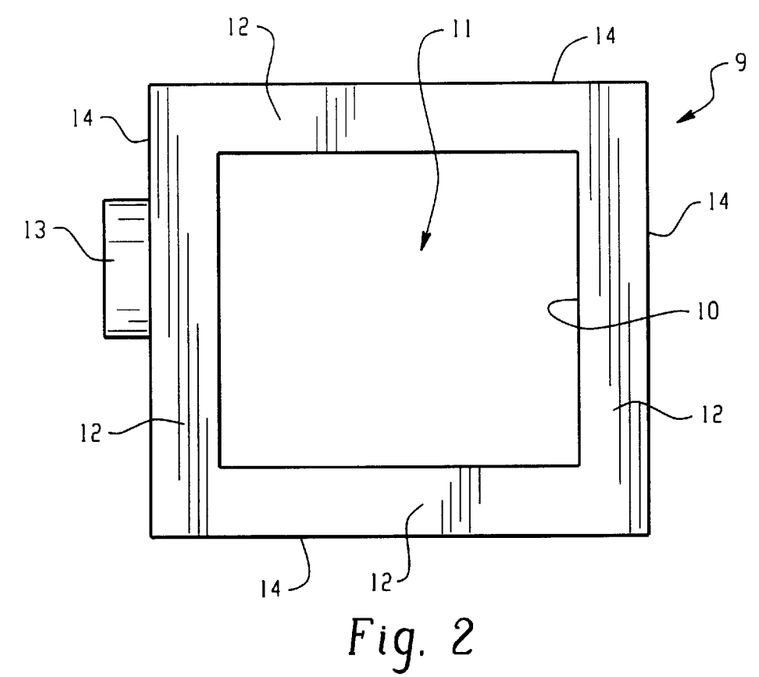
FIG. 2 is a plane view of an embodiment of the flexible electro-optic display assembly, such as that illustrated in FIGS. 1A, 1B and 1C.

In the embodiment shown in FIGS. 1A and 1B, the individual layers of the laminate assembly are held together in sliding apposition by a structure element, such as a flexible frame structure 9 having an inner periphery 10 defining a viewing area 11 which is better seen in FIG. 2. The flexible frame structure engages peripheral portions of the laminate assembly so as to maintain the layers of the laminate assembly 8 in the sliding apposition until flexing of the display assembly allows the individual layers to slide relative to each other. The materials used for the flexible frame structure are preferably softer and more elastic than those used for the substrates, and have no requirement to be optically clear. For example, the flexible frame can be made from vinyl, urethane, polyethylenes, polyvinyl chloride, cellulose derivatives, vinyl resins, polystyrenes, polyamides, polyimides, polycarbonates, paper, rubber; mica tape, plate or sheet, glass cloth, and the like. The flexible frame can be made from a polymer film, preferably an adhesive-back film. Exemplary films can include, but are not limited to, Kapton®, Nomex® and Mylars® (E.I. duPont de Nemours Co.). For example, an adhesive-based film can be folded over the laminate stack. An optically clear film can cover all or part of the viewing area for the electro-optic display, if desired.

In any of the embodiments according to the invention, spacing elements 12 that prevent direct contact between the inner surfaces of the laminate layers may be incorporated, as illustrated in FIG. 1B. The spacing elements are used to prevent optical interference patterns resulting when the inner surfaces come in contact. Such patterns are commonly called Newton rings or fringes. Spacing between layers is usually maintained at less than 10 mils, though the exact gap is not critical other than that the gap must be greater than ½ the longest wavelength of light of interest. Methods commonly used by those skilled in the art include printing the spacer elements onto at least one of the surfaces. Other methods may involve use of adhesive-coated microspheres such as those used to maintain the cell gap in a liquid crystal cell.

Figure 1C:
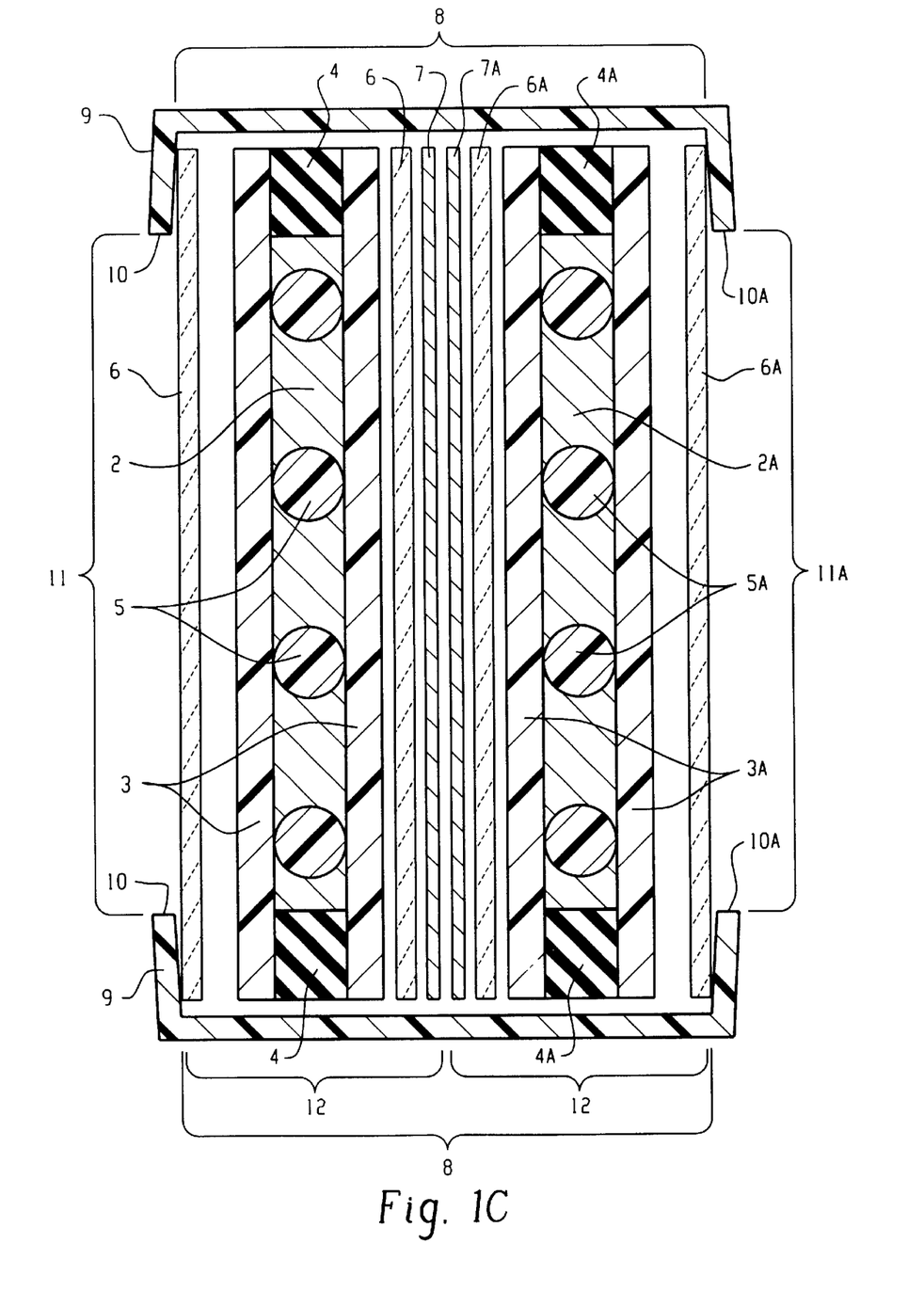
FIG. 1C is a view similar to FIG. 1A, illustrating two electro-optic display elements in a single electro-optic display assembly.

FIG. 1C illustrates an embodiment of the electro-optic display assembly that includes a second electro-optic display element 13, including its attendant layers that are similar to those of the display element 12 and are designated with an "A" in addition to the numerical identification. That is, a flexible electro-optic display assembly is provided that comprises a first electro-optic display element and a second electro-optic display element, wherein the first and second electro-optic display elements independently comprise a material having an optical state that changes as a function of an applied electric or magnetic field, at least one laminar layer in sliding apposition to the first or the second display element, and optionally one or more additional slidingly apposed laminar layers, wherein the first and second electro-optic display elements, the at least one laminar layer and the optional one or more additional laminar layers comprise individual layers of a laminate assembly; and a structure element 9 for fastening together the individual layers of the laminate assembly, wherein the structure element engages a portion of the laminate assembly so as to maintain the individual layers of the laminate assembly in the sliding apposition, wherein upon flexing of the laminate assembly, the individual layers slide relative to each other. The first and second display elements may be the same or may be different from each other. An advantage of this embodiment is that the electro-optic display assembly can comprise a front portion 11 and a back portion 11A, and the first and the second electro-optic display elements are positioned in the laminate assembly such that the first electro-optic display element provides an image on the front portion of the electro-optic display assembly and the second electro-optic display element provides an image on the back portion of the electro-optic display assembly.

Figure 3:
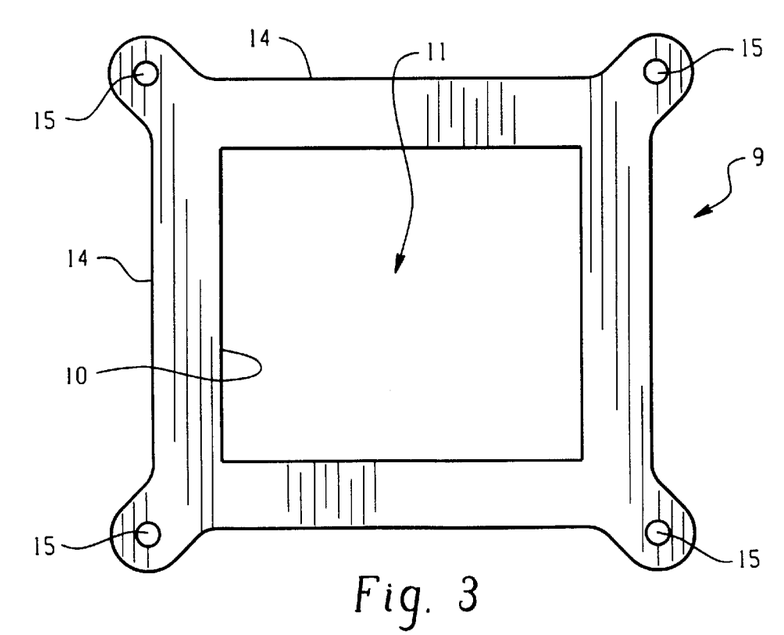
FIG. 3 is a plane view of an embodiment of the flexible electro-optic display assembly wherein the structure element contains means for mounting the display assembly into a device or housing.

FIG. 2 illustrates one embodiment of a structure element such as the flexible frame in which the shape of the frame is generally a rectangle having four sides 12. However, a flexible frame can have a variety of different shapes, such as oval or irregular shapes, and the like, without limitation. A flexible tail 13 for connecting the liquid display element to conventional display driver electronics is also illustrated. The flexible frame can have an outer periphery 14 for inserting the flexible display assembly into a housing (not shown) such as a mobile communications device, a watch, a PDA, or the like, or other electronic device, such as a cellular telephone, a calculator, a clock, an integrated circuit chip card, a pager, a computer, a television set, or the like. Mechanical features can be added to the frame to aid with mounting of the flexible electro-optic display assembly into the device into which it is to be integrated. For example, as illustrated in FIG. 3, mounting holes 15 can be placed between the outer and inner peripheries of the flexible frame structure. Alternatively, exemplary mounting means can be, but are not limited to, pegs, rivets, velcro, or the like, or combinations of these. The mounting means can be flexible or rigid. The mounting means can employ adhesives for mounting the display assembly into the device.

Figure 4:
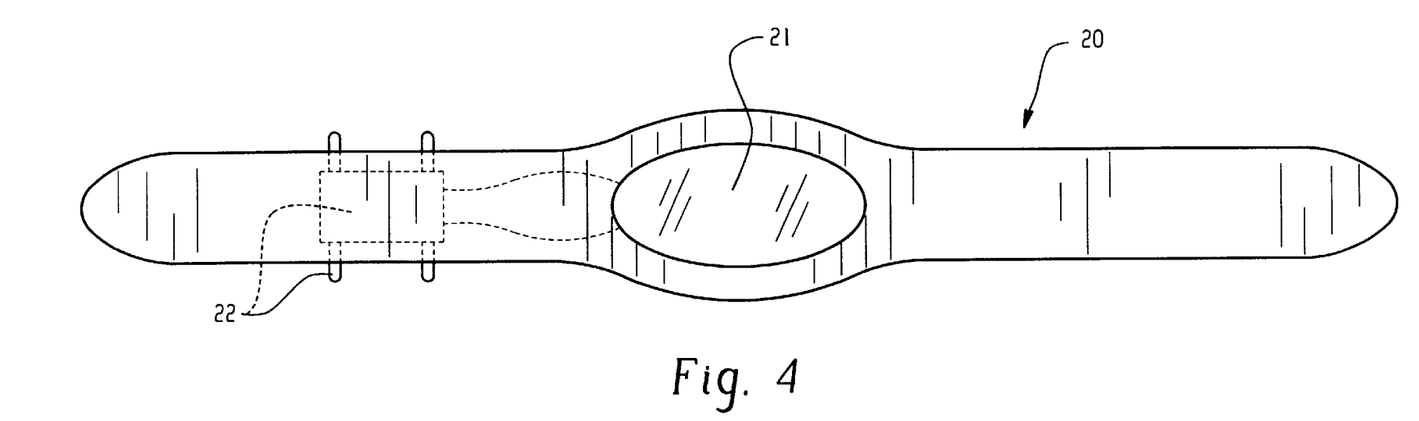
FIG. 4 is a plane view of an embodiment of the flexible electro-optic display assembly in which the structure element comprises a watch band.
Figure 5:
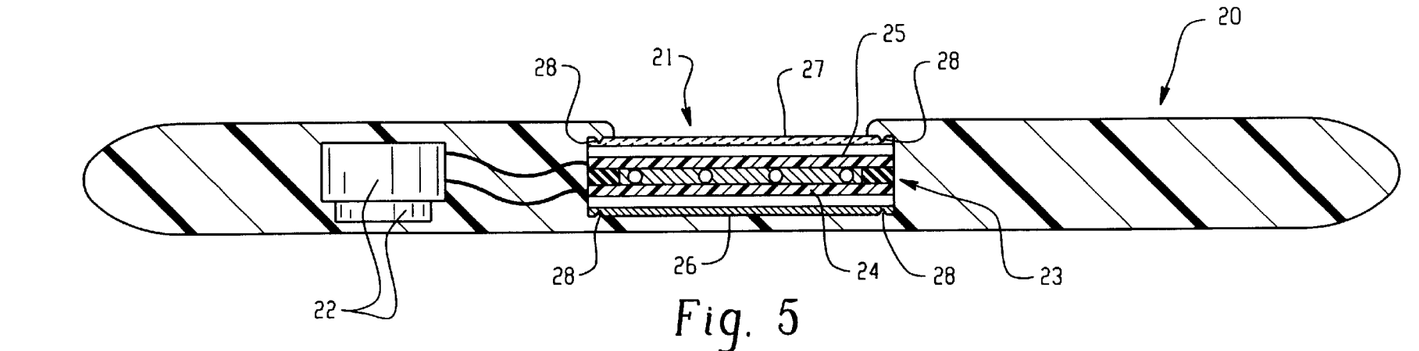
FIG. 5 is a cross-sectional view of the display assembly illustrated in FIG. 4.

In another embodiment of the invention, the structure element can engage the peripheral portions of the laminate assembly by overmolding, such as with a urethane or other thermoplastic polymer. In one such embodiment, the device in which the laminate assembly is to be employed can itself serve as the structure element. A non-limiting example of such a device is illustrated in FIGS. 4 and 5, which illustrate a watch band 20 that is a structure element for maintaining the individual layers of the laminate assembly of the electro-optic display 21 in the sliding apposition. The device, such as the watch band can further comprise conventional electronics, battery and controls 22, as known to those skilled in the art of electro-optic displays. As shown more clearly in FIG. 5, the flexible electro-optic display assembly includes the electro-optic display element 23 comprising the electro-optic material dispersed between substrates 24 and 25 and a reflector layer 26 slidingly apposed to an outer surface of one of the substrates 24. A clear protective top layer 27 can optionally be added to protect the display assembly from damage.

It may be desirable to provide a means for more firmly integrating the molding with the flexible laminate assembly. For example, small holes or notches 28 can be introduced in the peripheral areas of the laminate stack that can become filled with the polymer during the molding process. Such notches or holes can be produced, for example, by die cutting or by laser, such as a carbon dioxide laser, by known methods.

In another embodiment, the flexible electro-optic display assembly comprises a flexible frame structure having a top portion comprising an area for viewing the electro-optic display, and a body portion, wherein the top portion and the body portion comprise a housing for the laminate assembly so as to maintain the individual layers of the laminate assembly in the sliding apposition, wherein upon flexing of the housing, the individual layers of the laminate assembly slide relative to each other.

Figure 6A:
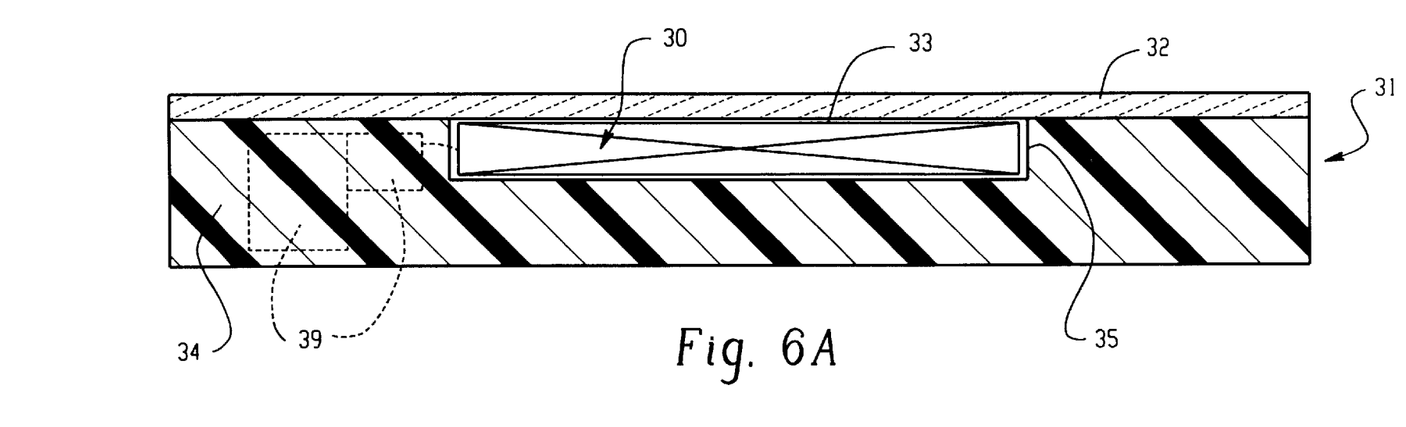
FIGS. 6A and 6B are cross-sectional views of embodiments of a laminate assembly housed in a flexible plastic card which comprises a structure element for holding together the layers of the laminate assembly in sliding apposition.
Figure 6B:
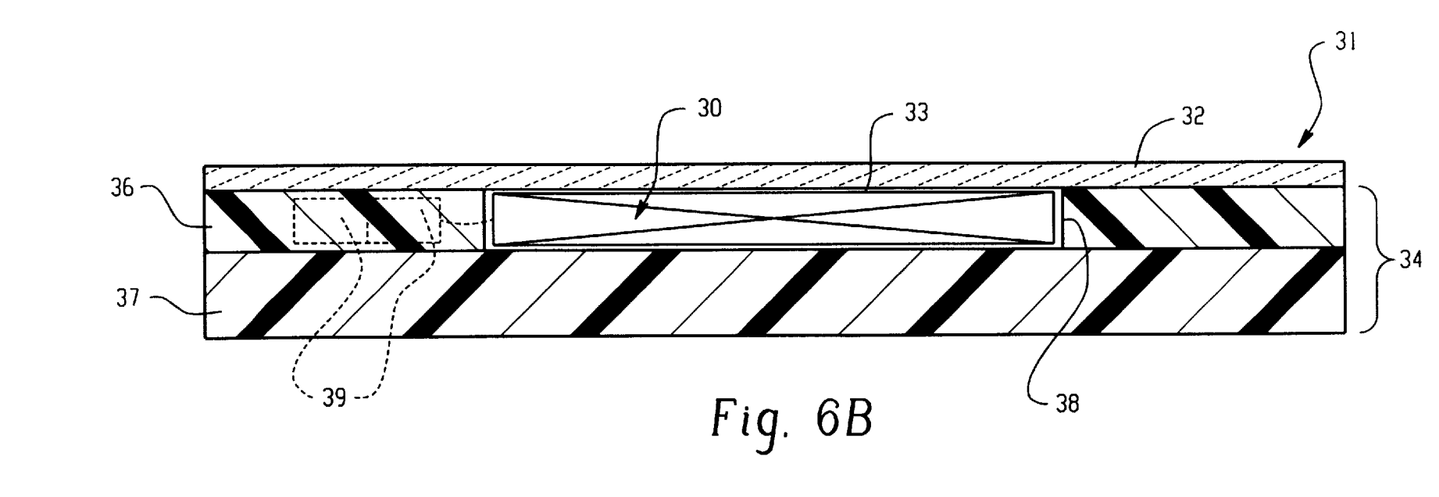

An illustrative example of this embodiment is shown in FIGS. 6A and 6B, in which the laminate assembly 30 is incorporated into a laminated flexible plastic card 31, such as an integrated circuit chip card. In the embodiment shown in FIG. 6A, the card comprises a top cover 32 for viewing the electro-optic display 33 and a body portion 34 that is preferably opaque. The laminate assembly 30 is layered and fitted into an appropriately sized opening 35 in the body portion 34 and the top cover 32 is laminated to the body portion 34, thus forming a housing that encloses and holds together the layers of the laminate assembly in sliding apposition. In an alternative embodiment shown in FIG. 6B, the body portion 34 comprises an inner body 36 and a bottom cover 37. The top cover 32, the inner body 36 and the bottom cover 37 are configured to provide an appropriately sized opening 38 for the laminate assembly 30 to hold together the layers of the laminate assembly in sliding apposition and to contain the assembly within the housing. Upon flexing of the plastic card, the individual layers of the laminate assembly slide relative to each other. An advantage of providing a laminate assembly having slidably apposed layers into a flexible plastic card is that the card can flex sufficiently to meet strict flexure life-test performance standards without delamination of the electro-optic display.

The integrated circuit chip card can further comprise electronic connections to the laminate assembly, integrated circuits, battery and controls 39, including micromodular electronic systems and the like, as known to those skilled in the art of electronic displays in integrated circuit chip cards, such as the chip card disclosed in U.S. Pat. No. 6,019,284, the disclosure of which is hereby incorporated by reference.

Figure 7A:
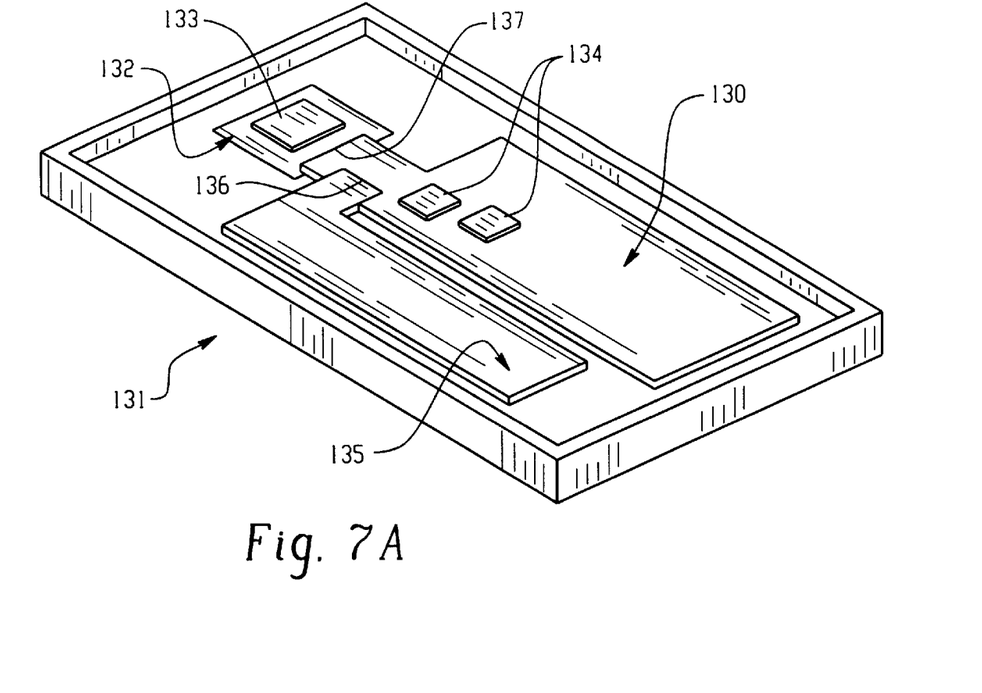
FIGS. 7A and 7B are embodiments of the inside of the top cover of a flexible plastic card showing circuitry and battery connections.
Figure 7B:
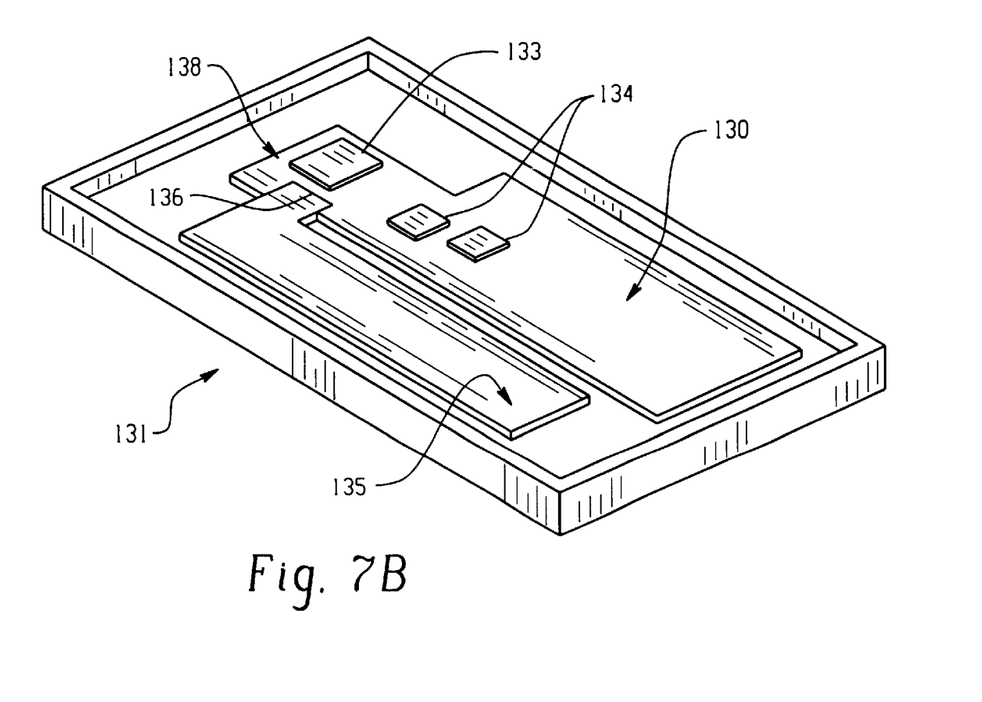

FIGS. 7A and 7B illustrate more detailed views of embodiments of the inside of the top cover of a smart card 131 and the non-viewing area surface of the laminate assembly. As shown in FIG. 7A, the electro-optic display assembly 130 is connected to a micromodule (a printed circuit board) 132 having an integrated circuit 133 for smart card functions. Also illustrated are additional integrated circuits and passive components 134 located on the display assembly 130. A battery 135 is connected to the display assembly by a contact ledge 136. The display assembly is connected to the micromodule by a contact ledge 137. FIG. 7B illustrates another embodiment of the inside of the top cover that does not include a separate micromodule. That is, the display assembly 130 comprises a micromodule area 138 containing integrated circuit 133 for smart card functions. The battery 135 is connected to the micromodule area 138 of the display assembly 130 by the contact ledge 136.

In some embodiments of the structure element such as the flexible frame structure and/or fasteners described herein, when the display is not in flexed configuration, the structure element holds the layers of the laminate assembly in the correct alignment to allow the display to function correctly. When the display is flexed into a curved shape, the performance of the display may be degraded. For those embodiments which have degraded performance during flexure, once the display is allowed to resume its original shape the display will regain its original performance characteristics. In other embodiments, the laminate assembly and structure element are manufactured in a pre-flexed configuration and the structure element holds the layers of the flexed laminate assembly in the correct alignment to allow the display to function correctly.

In yet another embodiment of the flexible electro-optic display assembly of the invention, the electro-optic display element, the at least one laminar layer and the optional one or more additional laminar layers comprise individual layers of a laminate assembly having a deflection axis. A fastener is provided for fastening together the individual layers of the laminate assembly. The fastener maintains the individual layers of the laminate assembly in a first position relative to one another at the fastener, and wherein upon flexing of the display assembly, the individual layers slide relative to each other in regions outside of the fastener.

Figure 8:
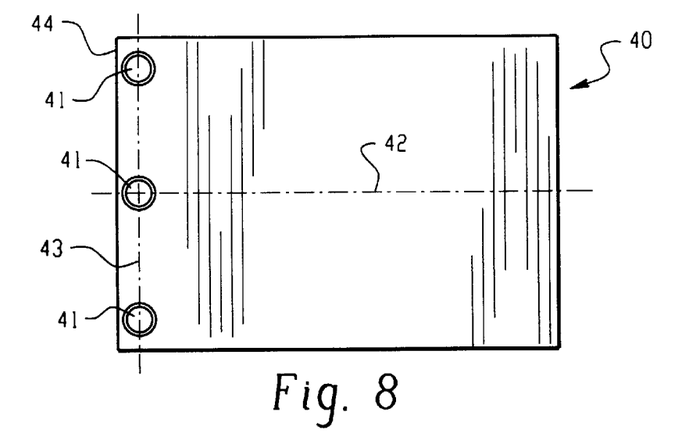
FIG. 8 illustrates an embodiment of the flexible electro-optic display assembly wherein the layers of the laminate assembly are held together by one or more fasteners placed on a fixation axis orthogonal to a deflection axis.
Figure 9:
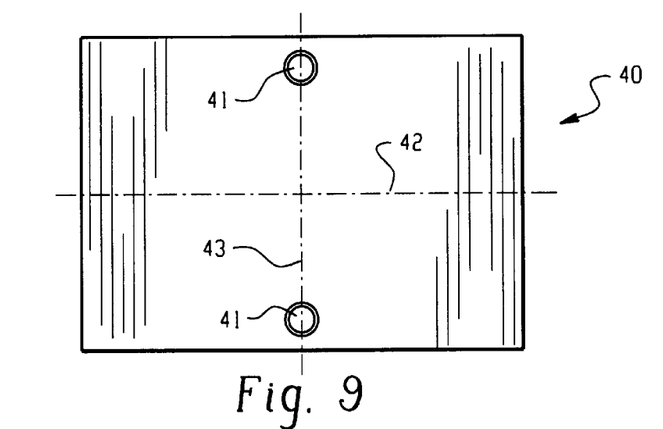
FIG. 9 illustrates an alternate placement of fasteners on a fixation axis orthogonal to a deflection axis.
Figure 10:
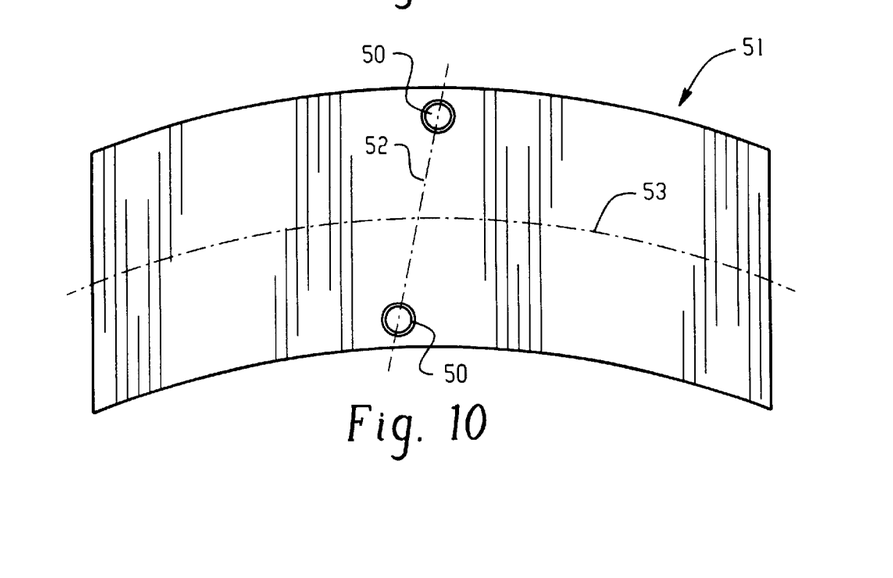
FIG. 10 illustrates a flexing of an embodiment according to FIG. 9.

For example, FIGS. 8 and 9 illustrate a laminate assembly 40 that is held together by two or more rigid or flexible fasteners such as, but not limited to, two or more rivets 41 placed on a so-called fixation axis 43 that is at a non-zero angle to a deflection axis 42. That is, the layers of the laminate assembly 40 cannot slide relative to each other on the fixation axis. However, the layers can slide relative to each other outside of the fixation axis. The deflection axis 42 is determined by the axis at which the assembly is bent; that is, it is non-specific to a particular display and will change depending on the direction in which the display is bent. As a non-limiting example, the fixation axis 43 along which the rivets 41 are placed can be at a side 44 of the laminate assembly or can be centrally located, as illustrated in FIG. 8 and 9, respectively. However, the fixation axis can be located anywhere on the laminate assembly depending on the configuration and location of the deflection axis. In a similar embodiment illustrated in FIG. 10, two or more fasteners 50 can hold together the layers of the laminate assembly 51 and are placed on an axis 52 orthogonal to a deflection axis 53. In this embodiment, the orthogonal axis is a fixation axis. The layers can slide relative to each other outside of the fixation axis during flexing of the laminate assembly.

Figure 11:
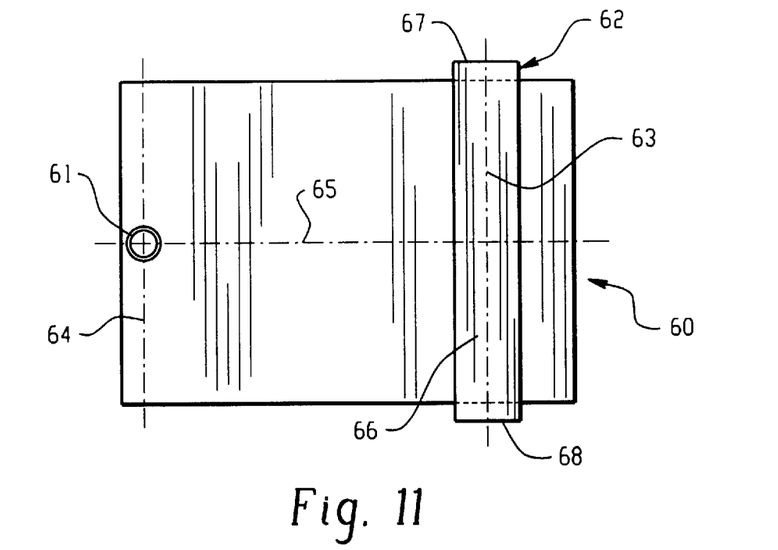
FIG. 11 illustrates an embodiment of the flexible electro-optic display assembly where the layers of the laminate assembly are held together by a single fastener in conjunction with a collar positioned along a second orthogonal axis.
Figure 12:
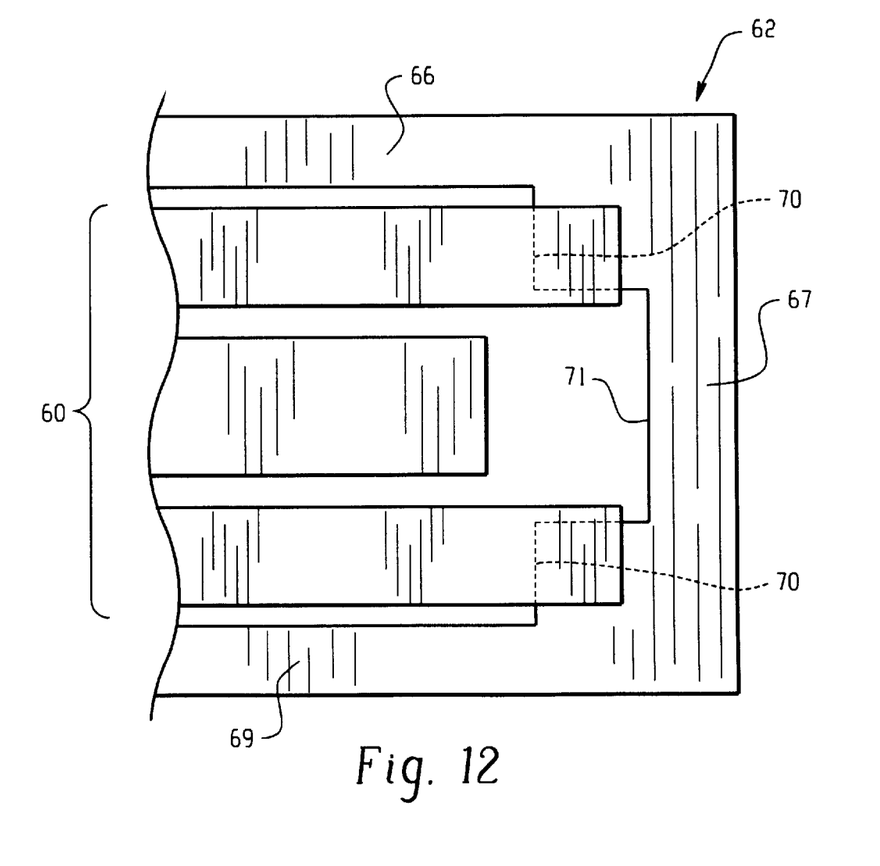
FIG. 12 illustrates a detail view of the collar of FIG. 11.

In the embodiment illustrated in FIGS. 11 and 12, a single fastener, such as a rivet 61 is used in conjunction with a collar 62 positioned along a fixation axis 63. In this embodiment, the collar positioned along the fixation axis maintains rotational alignment between the layers of the laminate assembly 60 about the axis 64 of the fastener 61, but still allows for flexure along the displacement axis 65. The collar 62 may be a rigid, semi-flexible, or flexible element that may be either fully circumferential around the laminate assembly 60 or only semi-circumferential. A semi-circumferential collar comprises an elongated portion 66 having opposite ends 67 and 68. A fully circumferential collar comprises an additional elongated portion 69 connecting the ends 67 and 68. The collar may also contain features which constrain the motion of one or more layers relative to each other along the displacement axis. For example, as illustrated in FIG. 12, molded protrusions 70 on an inner wall 71 of the collar keep the collar from sliding off the laminate assembly.

Figure 13A:
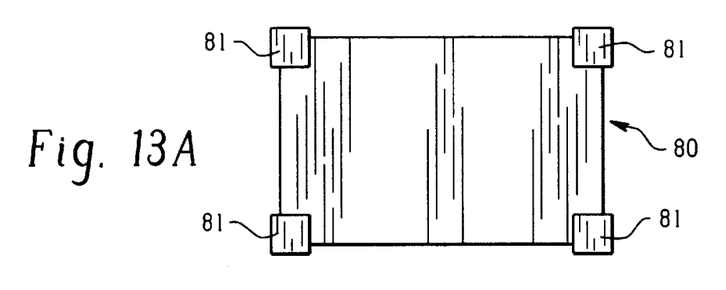
FIGS. 13A, B and C illustrate an alternative embodiment of FIGS. 8 and 9, wherein the fasteners take the form of clips.
Figure 13B:
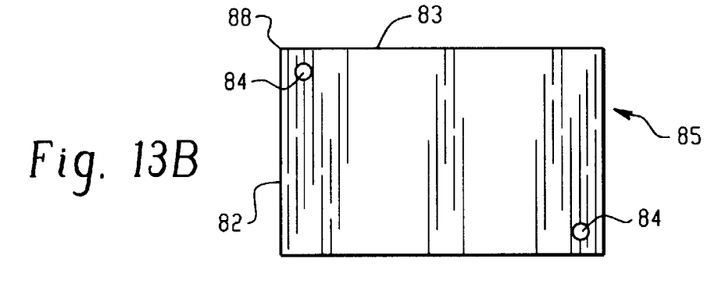
Figure 13C:
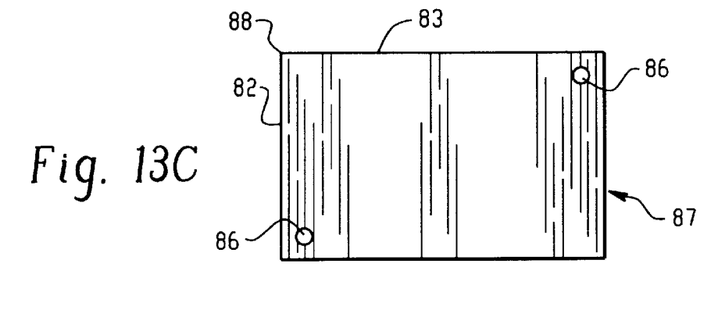
Figure 14A:
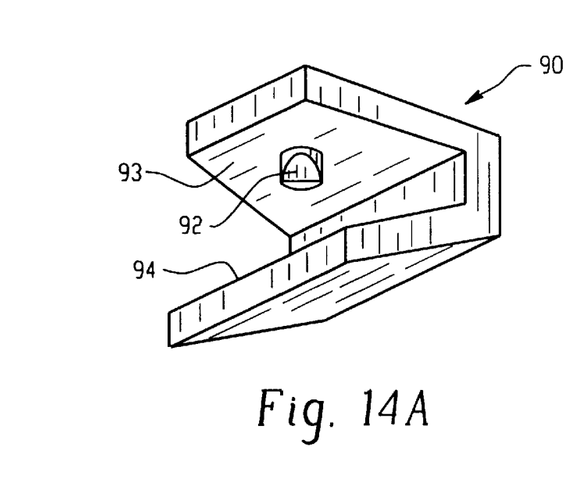
FIGS. 14A and B illustrate details of the clips used in FIG. 13.
Figure 14B:
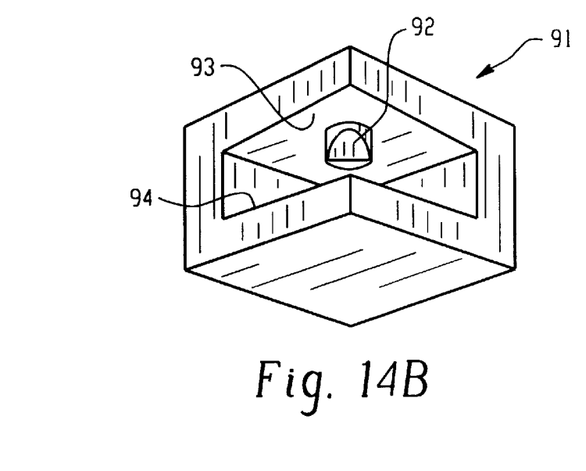

In an alternative embodiment illustrated in FIGS. 13 and 14, one or more clips 81 can be employed as fasteners to hold together the laminate stack forming the display 80. The clips can be located on the sides of the display. However, as illustrated in FIG. 13A, the clips 81 can be located in the corners of the display if the display is rectangular in shape. That is, the display assembly has a periphery comprising at least a first side 82 and a second side 83 that intersect to form a corner area 88 of the assembly, and the fastener is located in the corner area of the display assembly. If the display has curved outer edges, the clips can be formed so as to closely conform to the perimeter of the display edge with which it comes into contact. Possible configurations of a clip 90 conforming to a side of the display and a clip 91 conforming to a corner of the display are illustrated in FIGS. 14A and 14B respectively. It is also preferable that the upper 93 or lower 94 inner surfaces, respectively, of the clips which come into contact with the laminate stack have protrusions 92 that extend into holes or depressions in the outer layers of the laminate stack so as to retain the clips in the desired position relative to the laminate stack. For example, FIG. 13B illustrates a hole or depression pattern 84 in a top sheet 85 of the laminate stack. FIG. 13C illustrates a hole or depression pattern 86 in a bottom sheet 87 of the laminate stack. The protrusions may be on both the upper and lower inner surfaces of the clips, but it is preferable that the protrusions only be on one of the inner surfaces. The latching mechanism provided by the protrusion/hole combination may be augmented with a heat or ultraviolet light activated adhesive on the inner surface with the protrusion. This single-sided latching mechanism allows for all laminate layers to slide apposing with each other. Additionally, the side of the display on which the single-sided latch is located can be alternated so that each outer laminate layer can have at least one clip latched to it.

Figure 15:
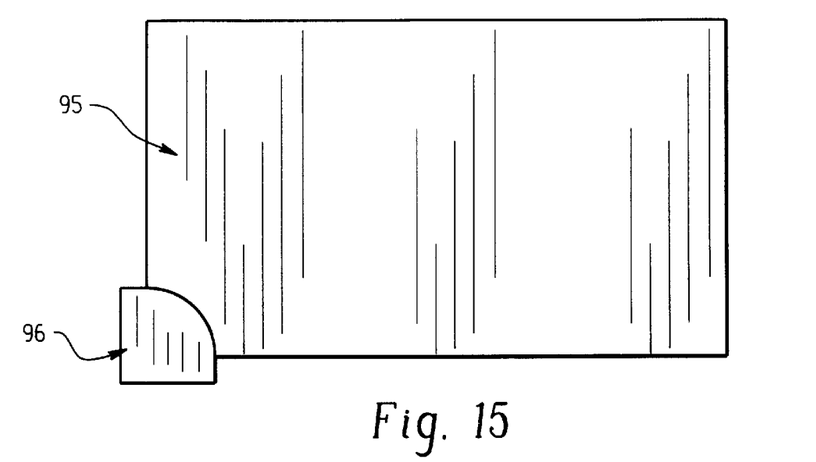
FIG. 15 illustrates an embodiment in which a single rivet assembly is employed to hold together the layers of the laminate assembly.
Figure 16A:
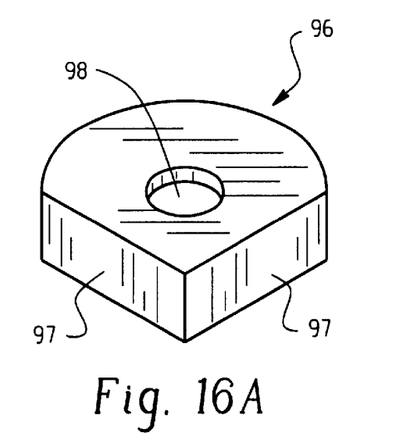
FIGS. 16A, B and C illustrate detail views of the rivet assembly.
Figure 16B:
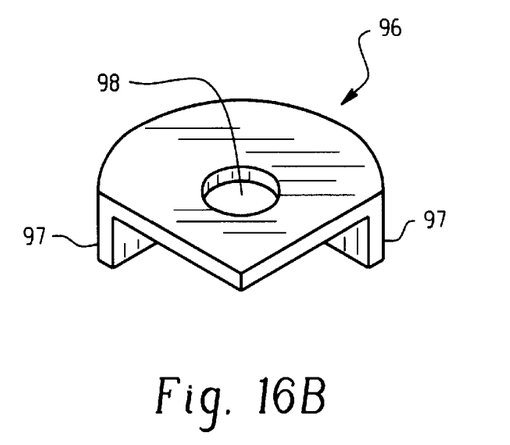
Figure 16C:
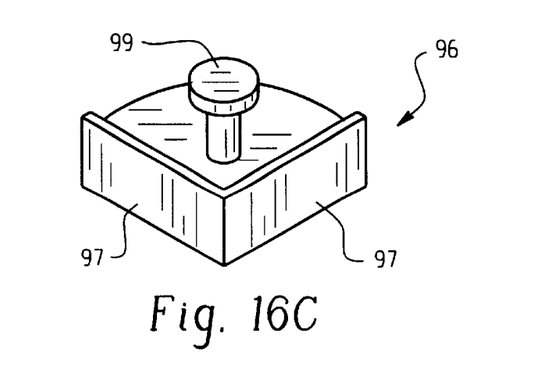

In another embodiment, a single rivet assembly 96 may be used as shown in FIG. 15 and in more detail in FIG. 16 wherein the rivet is located in a corner of the display 95. Features are incorporated in the rivet assembly 96 that, when riveted to the laminate stack, align with edges of the stack that intersect at the corner at which the rivet is located. FIGS. 16A, 16B and 16C illustrates an outer oblique view of the top half of the rivet assembly 96, a rear view of the top of the rivet assembly, and a view of the bottom half of the rivet assembly, respectively, showing corner alignment rails 97 and insertion hole 98 for a rivet 99. In this way, a single rivet with corner alignment features can be used to hold together the laminate stack, both rotationally and laterally, while still allowing for the individual layers to slide against each at all points other than at the rivet.

In any of these embodiments incorporating one or more fasteners, preferably optically clear fasteners may be used in the area for viewing the electro-optic display, if desired. Means for fastening the layers together can also include other conventional fasteners, such as pins, bolts, screws, clamp pairs, and the like, known to those skilled in the art. The fasteners may be rigid or flexible.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have elements that do not differ from the literal language of the claims, or if they include equivalent elements with insubstantial differences from the literal language of the claims.

I claim:

1. A flexible electro-optic display assembly comprising:
    an electro-optic display element that comprises a material having an optical state that changes as a function of an applied electric or magnetic field,
    at least one laminar layer in sliding apposition to the display element, and
    optionally one or more additional slidingly apposed laminar layers,
    wherein the electro-optic display element, the at least one laminar layer and the optional one or more additional laminar layers comprise individual layers of a laminate assembly; and
    a structure element for fastening together the individual layers of the laminate assembly, wherein the structure element engages a portion of the laminate assembly so as to maintain the individual layers of the laminate assembly in the sliding apposition, wherein upon flexing of the laminate assembly, the individual layers slide relative to each other.

2. The flexible electro-optic display assembly of claim 1, wherein the electro-optic display element further comprises at least one electro-optic flexible substrate for the material having the optical state, and wherein at least one of the laminar layers is in sliding apposition to an outer surface of the substrate.

3. The flexible electro-optic display assembly of claim 2, wherein the flexible substrate comprises a material selected from the group consisting of plastic, flexible glass, a composite of a polymer and a ceramic, a composite of a polymer and an inorganic material, and combinations thereof.

4. The flexible electro-optic display assembly of claim 2, wherein the material having the optical state is disposed between two flexible electro-optic substrates bonded together, and wherein at least one of the laminar layers is in sliding apposition to an outer surface of one of the substrates.

5. The flexible electro-optic display assembly of claim 4, wherein the flexible substrates individually comprise a material selected from the group consisting of plastic, flexible glass, a composite of a polymer and a ceramic, a composite of a polymer and an inorganic material, and combinations thereof.

6. The flexible electro-optic display assembly of claim 1, wherein the material having the optical state is selected from the group consisting of a liquid crystal, a polymer dispersed liquid crystal, an electrophoretic microparticle, a rotating bichromal microbead, a thin film electroluminescent material, an organic light emitting diode and an electrochomic material.

7. The flexible electro-optic display assembly of claim 1, wherein each of the laminar layers are independently selected from the group consisting of a polarizer, an analyzer, a reflector, an optical compensation element, a touchscreen element, an anti-scratch layer, a protective barrier layer, and combinations thereof.

8. The flexible electro-optic display assembly of claim 1, wherein the structure element for fastening together the individual layers of the laminate assembly comprises a flexible frame structure having an inner periphery defining a viewing area for an electro-optic display, the flexible frame structure engaging peripheral portions of the laminate assembly.

9. The flexible electro-optic display assembly of claim 8, wherein the flexible frame structure comprises a rectangular shape having four sides.

10. The flexible electro-optic display assembly of claim 8, wherein the flexible frame structure comprises an irregular shape.

11. The flexible electro-optic display assembly of claim 8, wherein the flexible frame structure comprises an adhesive film.

12. The flexible electro-optic display assembly of claim 8, wherein the flexible frame structure comprises a molded plastic.

13. The flexible electro-optic display assembly of claim 12, wherein at least one of the layers of the laminate assembly comprises a means for facilitating engagement of the peripheral portions of the laminate assembly by the molded plastic.

14. The flexible electro-optic display assembly of claim 13, wherein the means for facilitating engagement is a notch or a depression in a peripheral portion of the laminate assembly.

15. The flexible electro-optic display assembly of claim 1, wherein the flexible frame structure comprises a watch band or a flexible plastic card.

16. The flexible electro-optic display assembly of claim 1, wherein the flexible structure for fastening together the individual layers of the laminate assembly comprises at least one clip engaging a peripheral portion of the laminate assembly.

17. The flexible electro-optic display assembly of claim 16, wherein the peripheral portion of the laminate assembly includes a side periphery, and the clip engages the side periphery.

18. The flexible electro-optic display assembly of claim 16, wherein the peripheral portion of the laminate assembly includes two side peripheries that intersect to form a corner of the periphery, and the clip engages the corner.

19. The flexible electro-optic display assembly of claim 18, wherein the corner is a square corner.

20. The flexible electro-optic display assembly of claim 18, wherein the corner is a curved corner.

21. The flexible electro-optic display assembly of claim 16, wherein the clip and the peripheral portion of the laminate assembly include a means for facilitating engagement of the clip to the peripheral portion.

22. The flexible electro-optic display assembly of claim 21, wherein the means for facilitating engagement comprises a latching element extending from the clip for engaging a corresponding element in the peripheral portion.

23. The flexible electro-optic display assembly of claim 21, wherein the means for facilitating engagement comprises a rivet.

24. The flexible electro-optic display assembly of claim 1, wherein the display assembly comprises an outer periphery for inserting the assembly into a housing.

25. The flexible electro-optic display assembly of claim 24, wherein the housing comprises an electronic device.

26. The flexible electro-optic display assembly of claim 24, wherein the housing comprises a watch band, a telephone, a calculator, a clock, a personal digital assistant, an integrated circuit chip card, a pager, a computer, a cellular telephone, a television set, and combinations thereof.

27. The flexible electro-optic display assembly of claim 24, wherein the display assembly comprises a mounting means for mounting the display assembly in a housing.

28. A flexible electro-optic display assembly comprising:
an electro-optic display element that comprises a material having an optical state that changes as a function of an applied electric or magnetic field,
at least one laminar layer in sliding apposition to the display element, and
optionally one or more additional slidingly apposed laminar layers,
wherein the electro-optic display element, the at least one laminar layer and the optional one or more additional laminar layers comprise individual layers of a laminate assembly; and
a flexible frame structure having a top portion comprising an area for viewing an electro-optic display, and a body portion, wherein the top portion and the body portion comprise a housing for the laminate assembly so as to maintain the individual layers of the laminate assembly in the sliding apposition, wherein upon flexing of the housing, the individual layers of the laminate assembly slide relative to each other.

29. The flexible electro-optic display assembly of claim 28, wherein the flexible frame structure comprises a flexible plastic card.

30. A flexible electro-optic display assembly comprising:
an electro-optic display element that comprises a material having an optical state that changes as a function of an applied electric or magnetic field,
at least one laminar layer in sliding apposition to the display element, and
optionally one or more additional slidingly apposed laminar layers,
wherein the electro-optic display element, the at least one laminar layer and the optional one or more additional laminar layers comprise individual layers of a laminate assembly having a deflection axis; and
a fastener for fastening together the individual layers of the laminate assembly,
wherein the fastener maintains the individual layers of the laminate assembly in a first position relative to one another at the fastener, and wherein upon flexing of the display assembly, the individual layers slide relative to each other in regions outside of the fastener.

31. The flexible electro-optic display assembly of claim 30, wherein the fastener is rigid.

32. The flexible electro-optic display assembly of claim 30, wherein the fastener is flexble.

33. The flexible electro-optic display assembly of claim 30, wherein the display assembly has a periphery comprising at least a first side and a second side that intersect to form a corner area of the assembly, and the fastener is located in the corner area of the display assembly.

34. The flexible electro-optic display assembly of claim 30, wherein the fastener is a rivet.

35. The flexible electro-optic display assembly of claim 33, wherein the fastener comprises a rivet assembly comprising an alignment portion that aligns the rivet assembly with the first side and the second side of the display assembly periphery at the corner area.

36. A flexible electro-optic display assembly comprising:
an electro-optic display element that comprises a material having an optical state that changes as a function of an applied electric or magnetic field,
at least one laminar layer in sliding apposition to the display element, and
optionally one or more additional slidingly apposed laminar layers,
wherein the electro-optic display element, the at least one laminar layer and the optional one or more additional laminar layers comprise individual layers of a laminate assembly having a deflection axis; and
at least two fasteners placed on a fixation axis oriented at a non-zero angle relative to the deflection axis for fastening together the individual layers of the laminate assembly on the fixation axis,
wherein the fasteners maintain the individual layers of the laminate assembly in a first position relative to each other along the fixation axis, and wherein upon flexing of the display assembly, the individual layers outside of the fixation axis slide relative to each other along the deflection axis.

37. The flexible display assembly of claim 36, wherein the fixation axis is orthogonal to the deflection axis.

38. The flexible display assembly of claim 36, wherein the fastener is flexible.

39. The flexible display assembly of claim 36, wherein the fastener is rigid.

40. A flexible electro-optic display assembly comprising:
a first electro-optic display element and a second electro-optic display element, wherein the first and second electro-optic display elements independently comprise a material having an optical state that changes as a function of an applied electric or magnetic field,
at least one laminar layer in sliding apposition to the first or the second display element, and
optionally one or more additional slidingly apposed laminar layers,
wherein the first and second electro-optic display elements, the at least one laminar layer and the optional one or more additional laminar layers comprise individual layers of a laminate assembly; and a structure element for fastening together the individual layers of the laminate assembly, wherein the structure element engages a portion of the laminate assembly so as to maintain the individual layers of the laminate assembly in the sliding apposition, wherein upon flexing of the laminate assembly, the individual layers slide relative to each other.

41. The flexible electro-optic display of claim 40, wherein the electro-optic display assembly comprises a front portion and a back portion, and wherein the first and the second electro-optic display elements are positioned in the laminate assembly such that the first electro-optic display element provides an image on the front portion of the electro-optic display assembly and wherein the second electro-optic display element provides an image on the back portion of the electro-optic display assembly.

* * * * *

UNITED STATES PATENT AND TRADEMARK OFFICE
CERTIFICATE OF CORRECTION

PATENT NO. : 6,655,788 B1  
DATED : December 2, 2003  
INVENTOR(S) : Gary A. Freeman It is certified that error appears in the above-identified patent and that said Letters Patent is hereby corrected as shown below:

Column 13,  
Line 4, delete "comer" and insert -- corner --.  
Line 6, delete both instances of "comer" and insert -- corner --.  
Line 8, delete both instances of "comer" and insert -- corner --.

Column 14,  
Line 11, delete "flexble" and insert -- flexible --.  
Lines 16 and 23, delete "comer" and insert -- corner --.

Signed and Sealed this

Seventeenth Day of February, 2004

JON W. DUDAS  
*Acting Director of the United States Patent and Trademark Office*